(12) United States Patent
Hull

(10) Patent No.: US 7,488,069 B2
(45) Date of Patent: Feb. 10, 2009

(54) VISION ENHANCING DEVICE

(75) Inventor: McAllister H. Hull, Albuquerque, NM (US)

(73) Assignee: Science & Technology Corporation @ UNM, Albuquerque, NM (US)

( * ) Notice: Subject to any disclaimer, the term of this patent is extended or adjusted under 35 U.S.C. 154(b) by 0 days.

(21) Appl. No.: 11/359,882

(22) Filed: Feb. 22, 2006

(65) Prior Publication Data

US 2006/0187409 A1    Aug. 24, 2006

Related U.S. Application Data

(60) Provisional application No. 60/654,999, filed on Feb. 22, 2005.

(51) Int. Cl.
*G02C 7/00* (2006.01)
*G02C 7/02* (2006.01)
*G02B 25/00* (2006.01)
*A61F 2/16* (2006.01)

(52) U.S. Cl. ................... 351/159; 351/160 R; 359/642; 359/643; 359/656; 623/6.11

(58) Field of Classification Search ..... 351/160 R–176, 351/159; 359/642–647, 656–671, 708–712, 359/720–748, 804–830; 623/6.11–6.62
See application file for complete search history.

(56) References Cited

U.S. PATENT DOCUMENTS

| | | | |
|---|---|---|---|
| 4,581,031 A | 4/1986 | Koziol et al. | 623/6 |
| 4,666,446 A * | 5/1987 | Koziol et al. | 623/6.33 |
| 5,969,790 A | 10/1999 | Onufryk | 351/175 |
| 6,139,145 A * | 10/2000 | Israel | 351/160 R |
| 7,113,352 B2 * | 9/2006 | Markowitz | 359/831 |
| 2006/0015180 A1 | 1/2006 | Peyman et al. | 623/6.36 |

OTHER PUBLICATIONS

Letter dated Mar. 7, 2001, from Bausch & Lomb to the inventor McAllister Hull providing A Guide For Submission Of Ideas.*
Letter dated Mar. 13, 2001, from the inventor forwarding a Basuch & Lomb Information Form as filled-in by the inventor and a submission of three pages referenced in the Information Form.*
Letter dated May 21, 2001, from Bausch & Lomb to the inventor McAllister Hull.*
Letter to Macular Degeneration International mailed on or about Jun. 20, 2001, by the inventor forwarding a submission of three pages referenced in the letter.*

* cited by examiner

*Primary Examiner*—Darryl J Collins

(57) ABSTRACT

A vision enhancing device for a person having macular degeneration of the retina, comprises a lens and a light diverging surface on the lens that symmetrically diverges away from the eye at an angle relative to an optic axis to redirect incident light away from the optic axis outwardly toward an un-diseased region of the retina. The light diverging surface can be a smooth surface, which can be a continuous curved surface, and can be a diverging conical surface. The lens can be an eyeglass lens, contact lens, intraocular lens, telescopic lens, correction lens, or magnification lens. A light diverging insert having a conical surface and, optionally, an end surface can be used in a lens for redirecting light to the un-diseased region of the retina.

41 Claims, 5 Drawing Sheets

VISION ENHANCING DEVICE

RELATED APPLICATIONS

This application claims benefits and priority of provisional application Ser. No. 60/654,999 filed Feb. 22, 2005.

FIELD OF THE INVENTION

The invention relates to a vision enhancing device for a person with macular degeneration, and in particular, a vision enhancing device having a light diverging surface on a lens that diverges light way from the optic axis outwardly toward the un-diseased region of the retina.

BACKGROUND OF THE INVENTION

The retina of the eye has two parts: the macula and peripheral retina. The macula is very small and in the center of the retina. The area surrounding the macula is the peripheral retina and makes up 95% of the retina.

The macula is necessary for normal central vision acuity and consists mostly of light-sensitive cells called cones. In macular degeneration, the light-sensitive cells are damaged and, thus, inoperative. Common causes of macular degeneration are age, diabetic retinopathy, ocular vascular accidents or disease, retinal dystrophies, central nervous system diseases, etc. The inoperative macula can create a very dim and blurred central spot in the vision field, called a scotoma, and the rest of the vision field can become dimmer than normal. The severity of the loss depends on the progression of the disease. In the advanced stages of macular degeneration, central vision may be reduced or completely lost making it impossible to read, watch television, drive, sew, etc.; however, the peripheral vision remains unaffected.

The peripheral retina provides side or peripheral vision for orientation in space and consists mostly of light sensitive cells called rods. The rods are more sensitive to light and motion than cones. The outer, peripheral part of the retina typically remains un-diseased and intact in persons with macular degeneration.

Surgical procedures, such as laser photocoagulation and photodynamic therapy, and therapeutic treatments, such as supplements or pharmaceutical agents have had mixed results for treatment of macular degeneration.

Additionally, vision aids such as eyeglasses fitted with special telescopes and magnifying glasses are commonly used by persons suffering from macular degeneration.

A bioptic telescope uses a plurality of lenses, constituting a Galilean telescope, to magnify the image formed on the retina of the eye and to provide light to the operative light-sensitive cells. However, the bioptic telescopes can only achieve a moderate image enlargement to a limited visual field and are cumbersome.

Magnifying glasses can provide image magnification and can be coupled with a light to assist in the transmission of light. However, distortion of the image increases with the power of magnification and the eyeglasses can be heavy due to the thickness of the lens.

Therefore, a need exists for a vision enhancing device for persons with macular degeneration that can redirect incident light away from the optic axis outwardly toward the un-diseased region of the retina.

SUMMARY OF THE INVENTION

An embodiment of the invention provides a vision enhancing device for a person having macular degeneration of the retina, comprising a lens and a light diverging surface on the lens that symmetrically diverges away from the eye at an angle relative to an optic axis to redirect incident light away from the optic axis outwardly toward an un-diseased region of the retina.

In an illustrative embodiment, the light diverging surface can be a smooth, continuous curved surface. The light diverging surface can be a diverging conical surface and can form a conical recess in the lens itself. The light diverging surface can be machined or cast on the lens.

The lens can be an eyeglass lens, contact lens, intraocular lens, telescopic lens, correction lens, or magnification lens.

In yet another illustrative embodiment of the vision enhancing device, an end surface can be included that is closer to the retina than the light diverging surface. The end surface can be a surface for redirecting light to the un-diseased region of the retina. An intermediate surface can also be provided between the light diverging surface and the end surface.

Another embodiment of the invention provides a vision enhancing device for a person having macular degeneration of the retina, comprising a lens and a light diverging insert in the lens, wherein the insert can comprise a conical surface that symmetrically diverges away from the eye at an angle relative to an optic axis toward an un-diseased region of the retina.

An end surface can be provided to redirect light to the un-diseased region of the retina. The conical and end surfaces can be disposed on a common insert body, where the end surface is closer to the retina than the conical surface. The end surface can be an arcuate end surface of a body attached to or formed as part of the insert. An intermediate surface can also be disposed between the conical and end surfaces.

In another embodiment a cylindrical region can be provided adjacent to the conical surface and can be disposed on a common insert body.

DETAILED DESCRIPTION OF INVENTION

The invention is especially useful for persons suffering from macular degeneration, but is not limited thereto as other retinal diseases and injuries can benefit therefrom.

An embodiment of the invention provides a vision enhancing device for a person having macular degeneration of the retina R, wherein the device comprises a lens L and a light diverging surface D on the lens L. The incident light I is parallel to the optic axis O until the interface at the light diverging surface D. The optic axis is a line that passes through the center of the pupil and the center of the macula M. At the light diverging surface D, the initial parallel rays I incident on the eyeglass lens can be refracted away from the optical axis at an angle determined by the angle of the light diverging surface D. The incident light rays I are redirected away from the macula as diverging light rays G. These diverging rays can form an annular pattern on the un-diseased region of the retina.

The light diverging surface D can be a smooth surface, where the smooth surface can be a continuous curved surface. The light diverging surface D is free from irregularities, roughness, or projections. After machining or casting of the diverging surface D, it can be polished to ophthalmic standards. The light diverging surface D is disposed on the lens and forms an angular surface sufficient to diverge light away from the optical axis and toward the un-diseased region of the retina.

Figure 1:
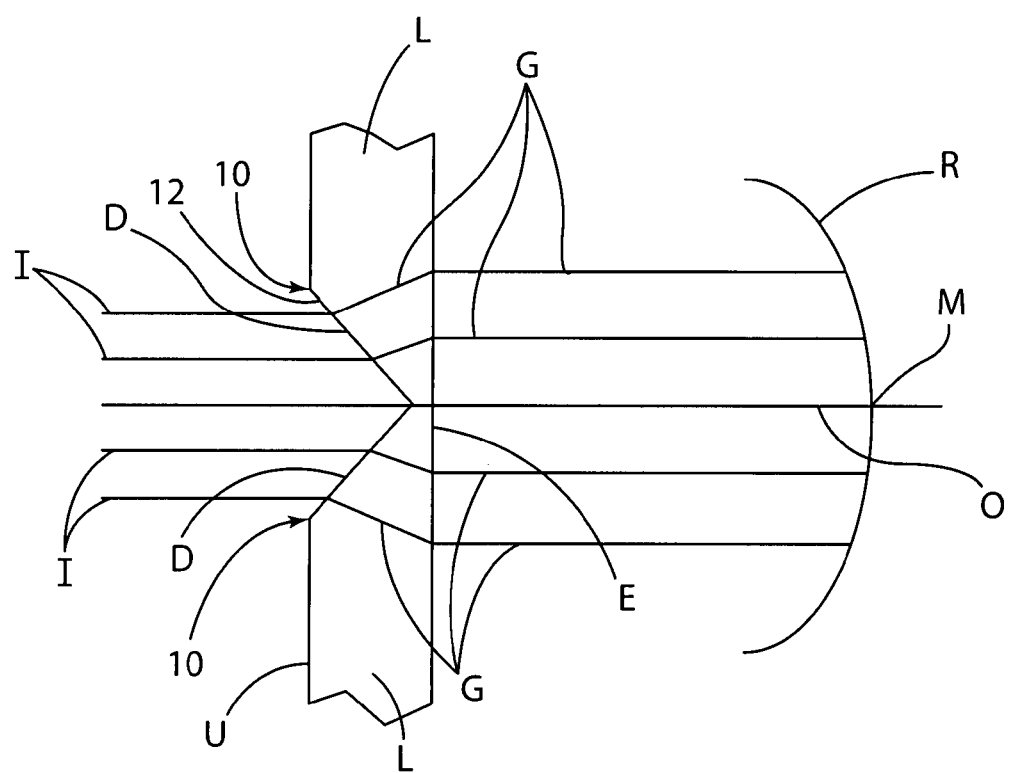
FIG. 1 is a sectional view of light rays passing through a lens, which has a light diverging surface and an end surface parallel to the outer lens surface, and to a retina. The lens is shown as partially broken away. The section lines are not shown for convenience in illustrating the light rays.
Figure 2:
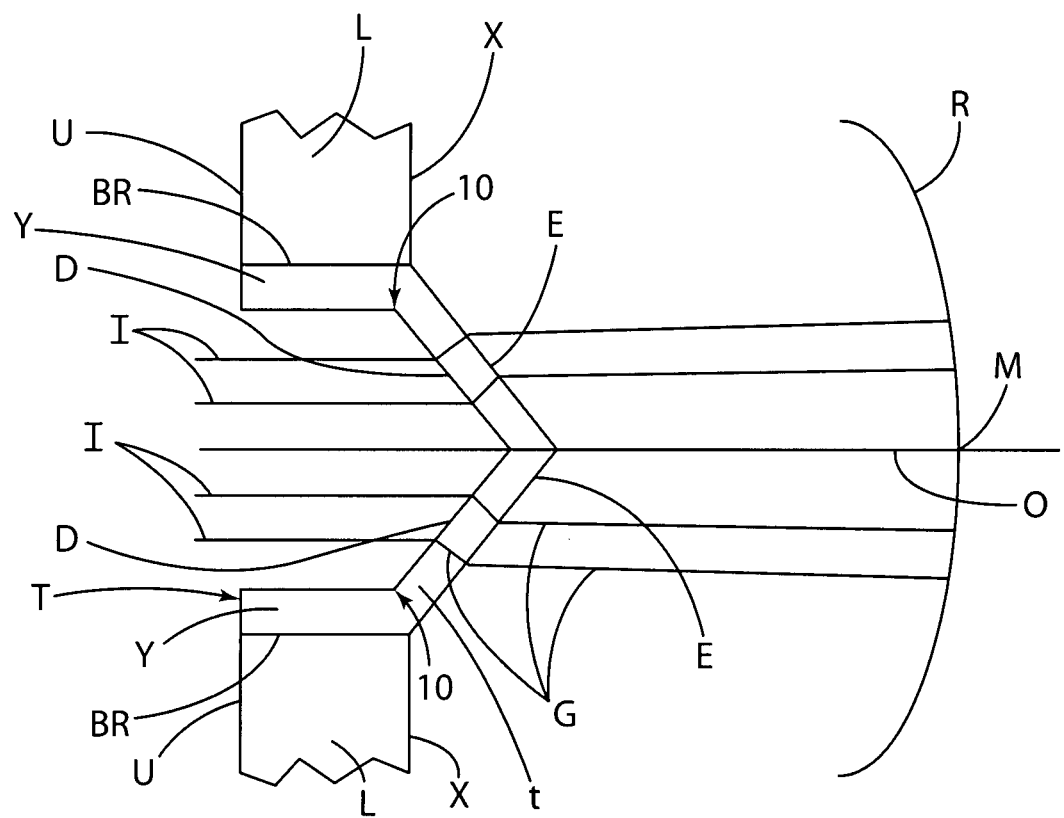
FIG. 2 is a sectional view of light rays passing through a lens, which has a light diverging surface and an end surface parallel to the light diverging surface, and to a retina. The lens is shown as partially broken away
Figure 3:
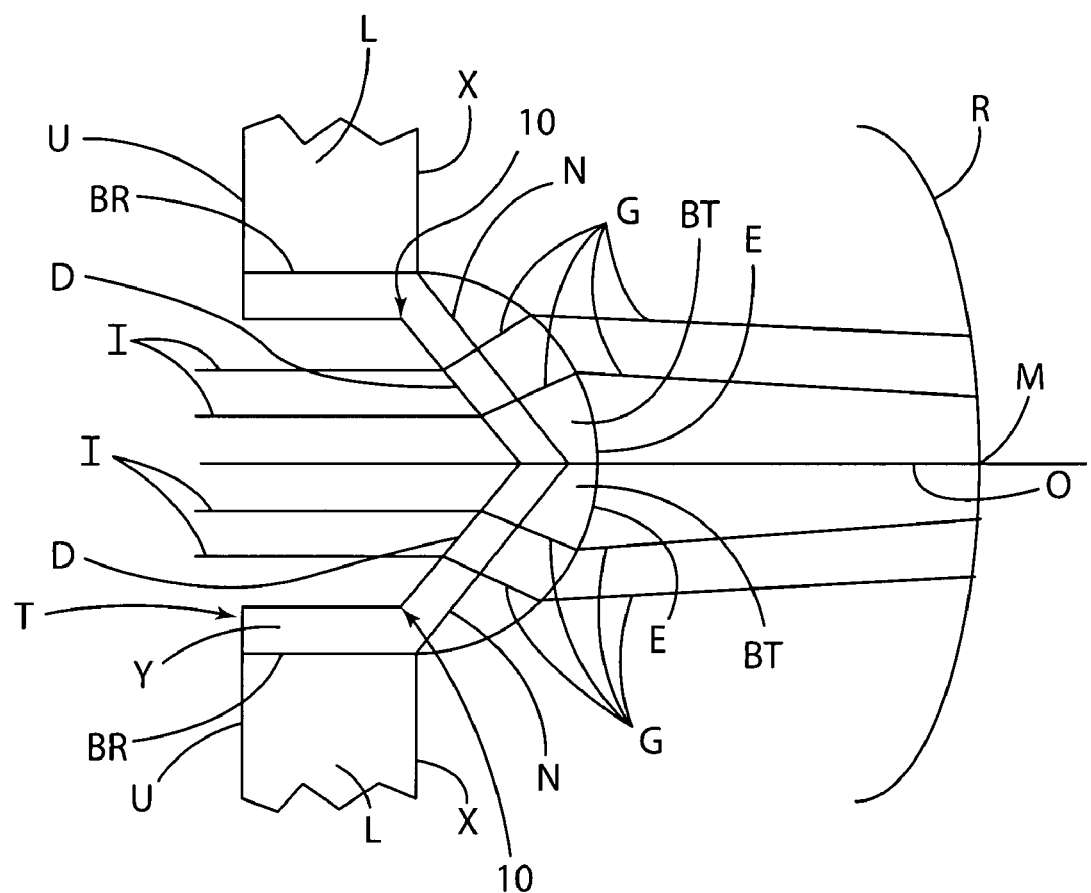
FIG. 3 is a sectional view of light rays passing through a lens with an insert, which has a conical surface and an arcuate end surface, and to a retina. The lens is shown as partially broken away.

The light diverging surface D, hereinafter referred to as conical surface, can be a diverging conical surface D that is symmetrical about the optic axis and can form a conical recess in the lens itself. The conical surface can have a circular base 10 and a wall 12 extending therefrom to an apex that is centered on the optic axis O. The invention also envisions that the apex can be an aperture in the lens itself. The base 10 of the conical surface D can be disposed on the outer lens surface U, as shown in FIG. 1; on the inner lens surface X; or between the outer and inner lens surfaces, as shown in FIGS. 2 and 3. The position of the base 10 in the lens L can be adjusted dependent upon the patient's needs.

The lens can be a conventional eyeglass lens, contact lens, intraocular lens, telescopic lens, correction lens, or magnification lens. The lens may provide no index of refraction or may include a prescription curvature and bifocals as required to provide a lens for a person having at least one eye with a central vision impairment.

The parameters of the conical surface depend upon the person's needs and the lens's characteristics. A conventional map of the eye and retina can be used to determine the dimensions of the patient's eye structures. For example, the eye diameter, macula diameter, index of refraction of the lens L, and the distance of the lens L from the eye can be used to determine the location and angle of the conical surface of the lens. After the type of lens has been chosen, calculations such as ray tracing with Snell's Law can be used to determine the angles at the air and lens interfaces. Snell's Law is as follows:

If the angle of incidence (defined as the angle between the incident ray and the perpendicular to the surface between the incident material and the emergent material) is called $a_1$, and the angle of the refracted ray (defined as the angle between the refracted ray and the perpendicular to the refracting surface) is called $a_2$, the index of refraction of the incident material is called $n_1$, and of the emergent material $n_2$, then Snell's Law reads: $n_1 \sin a_1 = n_2 \sin a_2$.

While the conical surface calculations are described above and in the illustrative examples using Snell's law, the calculations are not limited thereto as other methods such as including, but not limited to, the inverse Fourier Transform of the image and Newton's method can be used to determine the location and angle of the conical surface in the lens.

The conical surface D can be machined into the center of the lens L as shown in FIG. 1. Depending on the person's situation, a conventional corrective lens may or may not be used. To accommodate the depth of the conical surface D, a slightly thicker lens blank may be needed. A conventional machine such as but not limited thereto a lens grinder, lens abrader, or laser can be used to remove a conical portion from the lens to form the conical surface. The machine or the lens itself can be positioned to achieve the correct angle of conical surface D. The conical surface D can then be further polished to ophthalmic standards.

The invention also envisions that the conical surface D can be cast into a lens using a mold having a conical projection to form the conical surface D in the lens L.

Figure 4:
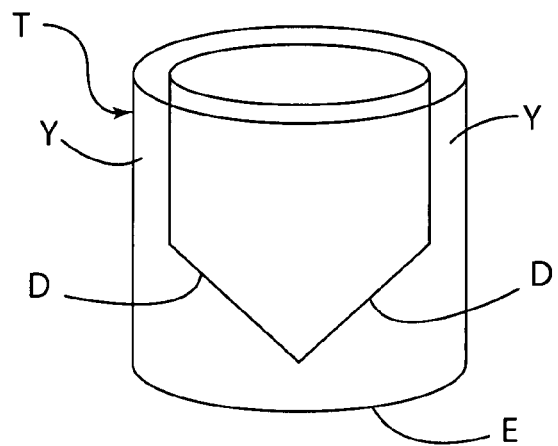
FIG. 4 is a perspective view of an insert having a cylindrical region and diverging surface.

Another embodiment of the invention, shown in FIGS. 2-4, provides a vision enhancing device for a person having macular degeneration of the retina, comprising a lens L and a light diverging insert T in the lens L, wherein the insert T can comprise a conical surface D that symmetrically diverges away from the eye at an angle relative to an optic axis O toward an un-diseased region of the retina R. In FIGS. 2-4, like or similar features as described in connection with FIG. 1 are designated with like reference characters. These features are offered to more fully illustrate the invention but are not to be construed as limiting the scope thereof.

The insert T can be machined from a lens blank using conventional machinery such as including, but not limited to, a lens grinder, lens abrader, or laser and polished. Alternately, the insert can be cast into the desired shape conventional techniques.

Figure 5:
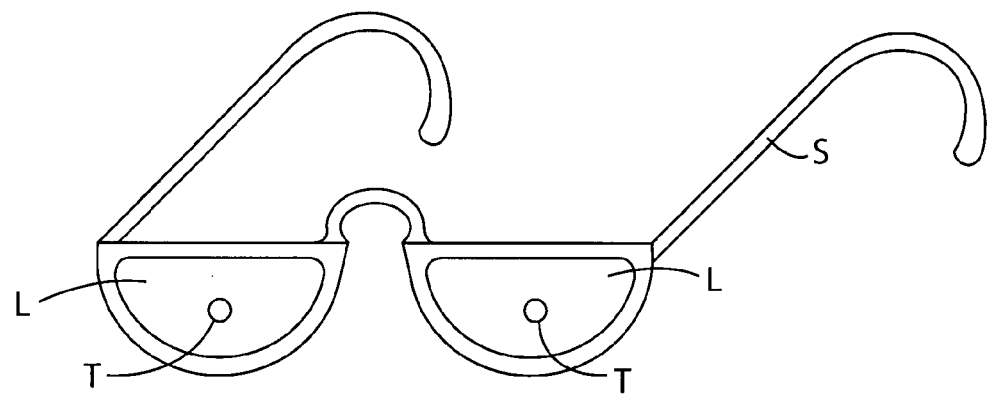
FIG. 5 is a perspective view of a pair of eyeglasses having an insert on each of the lenses.

A cylindrical bore BR can be machined into a conventional lens for receiving the insert T. The insert T can be adhered in the cylindrical bore using conventional optical grade adhesives such as including, but not limited to, refractive index-matching flexible adhesives. The insert T can be mounted to be flush with the outer and inner surface of the lens or, as shown in FIGS. 2 and 3, can protrude a few millimeters beyond the inner lens surface X. FIG. 5 shows a pair of eyeglasses S having a pair of inserts T mounted in a cylindrical bore in the lens L.

A cylindrical region Y can be provided adjacent to the conical surface D and can be disposed on a common insert body, as shown in FIGS. 2-4. The region Y is shown as cylindrical in shape having cylindrical symmetry about the optic axis but is not limited thereto as other shapes that can be inserted into a corresponding bore in the lens can be used. The length of cylindrical region Y can be modified to adjust the depth of the conical surface D in the lens L.

In still another embodiment shown in FIGS. 1-4, an end surface E can be provided on the lens L or on the insert T to redirect the diverging light rays G to the un-diseased region of the retina by providing a second refraction. For example and not limitation, the diverging light rays G can be redirected toward the optic axis O such as to the edge of the diseased macula and the un-diseased peripheral retina or redirected in other directions as needed by the user. This redirection can correct blurred vision due to refractive errors of the eye as with a conventional lens prescription.

The end surface E is closer to the retina than the conical surface D and can be formed of various shapes and configurations as required for redirecting light as needed by the user. The ends surface E has cylindrical symmetry about the optic axis O. For example and not limitation, Different shapes of end surface E can be used, as shown in FIGS. 1-4, such as including, but not limited to, an arcuate end, a hemispherical end, a conical end, or other body BT.

The end surface E can be cast or machined from a blank as part of a one-piece common insert body, as shown in FIGS. 2 and 4, or a one-piece lens, as shown in FIG. 1.

Alternately, the body BT having an end surface E can be formed separately from the insert T, as in FIG. 3, and can be constructed of a shape that can be received and adhered to the intermediate surface N. The body BT can be disposed on intermediate surface N to form a common insert body as shown in FIG. 3. In FIG. 3, the end surface E can be formed as an arcuate end, a hemispherical end, a conical end, or other body shape to meet the patient's needs. The body BT can be adhered to the intermediate surface N using optical grade adhesives such as including, but not limited to, refractive index-matching flexible adhesives.

The invention also envisions that the body BT can be formed integrally with the insert T.

The end surface E, as shown in FIGS. 1, 3, and 4, can displace the emergent diverging rays G toward the optic axis O and preferably but not limited to the peripheral retina.

FIG. 2 shows a conical end surface E that is parallel to the conical surface D. The conical surface D diverges the light rays G away from the optic axis O and the conical end surface E can redirect these diverging rays G in a direction generally parallel to the optic axis, as shown in FIG. 2. The shifted, divergent rays G can be directed toward the edge of the macula and the peripheral retina. In FIG. 2, the lens L having the conical end surface E can have a thickness t that is about 2 to about 3 millimeters for purposes of illustration and not limitation.

The following examples are offered in order to more fully illustrate the invention but are not to be construed as limiting the scope thereof. These examples assume that the macula has a diameter of 4 mm and is in the shape of a circle and the eye has a diameter of 24 mm and is in the shape of a sphere. Furthermore, the materials in these illustrative examples are assumed to be air and a glass lens, where the index of refraction (n) for air is 1 and the lens is 1.5.

EXAMPLE 1

Figure 6:
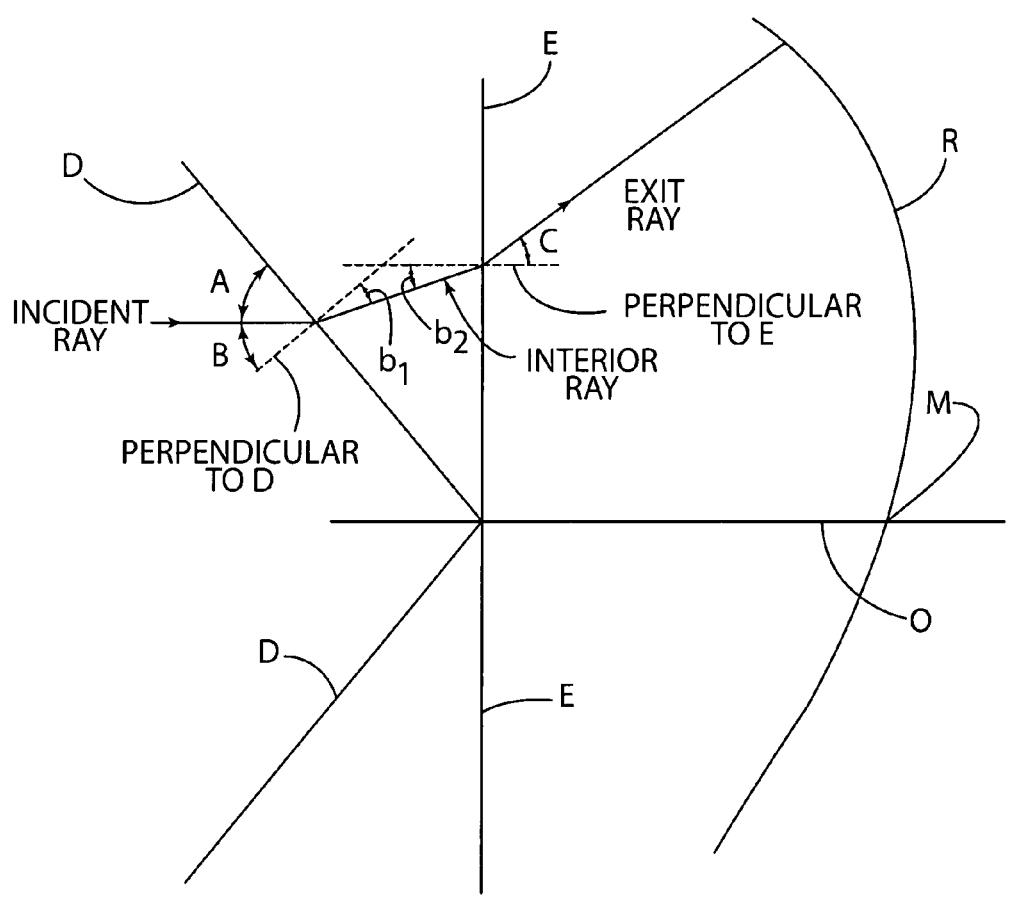
FIG. 6 is a diagram show the angles described in the calculations in the examples. Please note that this diagram is not to scale and the angles B, $b_1$, $b_2$, and c are exaggerated.

The design of this example is a conical surface drilled into a lens, as described above and shown in FIG. 1. The angle of incidence, B, see FIG. 6, means that the conical half angle $A=90°-B$. If the emergent angle from the lens is c, determined for a contact lens to be about 4.7°, and if the emergent ray is to strike the retina just outside the macula, then the interior angle, called $b_2$, is determined by applying Snell's Law: $\sin b_2 = \sin c/n$. The interior ray will reach the conical surface at an angle $b_1 = B - b_2$, where B is the apex angle of the wedge formed by the conical half angle A and the emergent surface. As the use of the same symbol indicates, B is equal to the angle of incidence to the lens surface. Snell's Law must be applied to the ray emergent inside the light diverging surface so that the angle of incidence is B; ie., $\sin B = n \sin (B-b_2)$, with $b_2 = \sin^{-1}(\sin c/n)$. the angle c and the index of refraction selected then determine B and hence $A=90°-B$. If the angles are relatively small (approximations indicate its around 11 or 12°, and c is small) one can approximate the sine of an angle by its value (in radians, where radian=57°, to a sufficient approximation). In the approximation for this illustrative embodiment, $$B=c/(n-1).$$

With the approximate value of B obtained from the simple formula, the successive approximations to B from the exact formula should converge rapidly. Using the dimensions indicated and an index of 1.5, one gets a value of B about 9.4°, and hence 2A=161°.

Other dimensions for ordinary eyeglasses can be used, which changes the angle c, and hence B. FIG. 4 is calculationally similar in that the insert can be a glass (n=1.5) of 6 mm in diameter and 2 mm thick and can receive a conical surface having a diameter 2 mm and an angle of 160°. This can be glued to the back of an ordinary eyeglass lens, where the optical axis and cone axis are coinciding.

EXAMPLE 2

Referring to FIG. 2, the entry and emergent surfaces are seen to be parallel (or coaxial with the same conical angle, to be precise). In this case, the incident and emergent rays will be parallel, with the emergent ray displaced away from the incident as shown. Snell's Law provides the amount of displacement for a given conical angle A. Again the incident angle for Snell's Law is B, see FIG. 6, where $A=90°-B$. The parameter of interest is the displacement, since this is the way the light is directed outside the macula. The displacement depends on the angle of incidence, the index of refraction, and the thickness t of the lens having the light diverging surface D thereon. Using Snell's Law, one finds $\sin b_1 = \sin B/n$. To calculate the displacement, one obtains the length of the ray's path in the glass, $L = t \cos b_1$, where t is the thickness (to be determined). Then the displacement is $d = t \cos b_1 \sin (B-b_1)$. If one takes n=1.5, and the displacement, d, is required to be 2 mm, and B is selected to be 60°, t is about 6 mm. If B=40°, t is about 8 mm. The depth of the cone with a 4 mm surface is about 1 mm when B=60°.

The central 25% of the light incident on the device can be sacrificed to reduce the thickness in half for each choice of B (one can also increase B to reduce the thickness).

A vision enhancing device pursuant to an embodiment described herein can be advantageous in that the conical surface can be wide enough to redirect incident rays to the un-diseased region of the retina, yet, the depth of the conical surface can be shallow enough for a conventional lens.

It is to be understood that the invention has been described with respect to certain specific embodiments thereof for purposes of illustration and not limitation. The present invention envisions that modifications, changes, and the like can be made therein without departing from the spirit and scope of the invention as set forth in the following claims.

I claim:

1. A vision enhancing device for a person having macular degeneration of the retina, comprising a lens and a light diverging surface on the lens that symmetrically diverges away from the eye at an angle relative to an optic axis to redirect incident light away from the optic axis outwardly toward an un-diseased region of the retina, said light diverging surface comprising a smooth, continous curved surface, and further comprising an end surface closer to the retina than the light diverging surface.

2. The vision enhancing device of claim 1 wherein the light diverging surface is a diverging conical surface.

3. The vision enhancing device of claim 1 wherein the light diverging surface forms a conical recess in the lens itself.

4. The vision enhancing device of claim 1 wherein the light diverging surface is machined on the lens.

5. The vision enhancing device of claim 1 wherein the lens is an eyeglass lens, contact lens, intraocular lens, telescopic lens, correction lens, or magnification lens.

6. The vision enhancing device of claim 1 wherein the end surface is disposed on the lens closer to the retina than the light diverging surface.

7. The vision enhancing device of claim 6 wherein the end surface is comprises a surface for redirecting light to the un-diseased region of the retina.

8. The vision enhancing device of claim 7 further comprising an intermediate surface between the light diverging surface and the end surface.

9. The vision enhancing device of claim 1 wherein the end surface comprises a conical surface.

10. The vision enhancing device of claim 1 wherein the end surface comprises an arcuate surface.

11. The vision enhancing device of claim 1 wherein the end surface comprises a complex surface.

12. The vision enhancing device of claim 1 wherein the end surface comprises a planar surface.

13. A vision enhancing device for a person having macular degeneration of the retina, comprising a lens and a light diverging insert in the lens, wherein said insert comprises a conical surface that symmetrically diverges away from the eye at an angle relative to an optic axis to redirect incident light away from the optic axis toward an un-diseased region of the retina, and further comprising an end surface for redirecting light to the un-diseased region of the retina.

14. The vision enhancing device of claim 13 wherein the conical surface and the end surface are disposed on a common insert body.

15. The vision enhancing device of claim 13 wherein the end surface is closer to the retina than the conical surface.

16. The vision enhancing device of claim 13 wherein the end surface is an arcuate end surface.

17. The vision enhancing device of claim 13 further including an intermediate surface between the conical surface and the end surface.

18. The vision enhancing device of claim 13 further including a cylindrical region adjacent to said conical surface.

19. The vision enhancing device of claim 14 wherein the cylindrical region adjacent to said conical surface.

20. The vision enhancing device of claim 13 wherein the end surface comprises a conical surface.

21. The vision enhancing device of claim 13 wherein the end surface comprises an arcuate surface.

22. The vision enhancing device of claim 13 wherein the end surface comprises a convex surface.

23. The vision enhancing device of claim 13 wherein the end surface comprises a planar surface.

24. The vision enhancing device of claim 23 wherein the planar surface is perpendicular to an axis of symmetry of said conical surface.

25. A vision enhancing device for a person having macular degeneration of the retina, comprising a lens and a light diverging surface on the lens that symmetrically diverges away from the eye at an angle relative to an optic axis to redirect incident light away from the optic axis outwardly toward an un-diseased region of the retina, said light diverging surface comprising a diverging conical surface, and further comprising an end surface on the lens closer to the retina than the light diverging surface for redirecting light to the un-diseased region of the retina.

26. The vision enhancing device of claim 25 wherein the light diverging surface forms a conical recess in the lens itself.

27. The vision enhancing device of claim 25 wherein the light diverging surface is machined on the lens.

28. The vision enhancing device of claim 25 wherein the lens is an eyeglass lens, contact lens, intraocular lens, telescopic lens, correction lens, or magnification lens.

29. The vision enhancing device of claim 25 wherein the end surface comprises a conical surface.

30. The vision enhancing device of claim 25 wherein the end surface comprises an arcuate surface.

31. The vision enhancing device of claim 25 wherein the end surface comprises a convex surface.

32. The vision enhancing device of claim 25 wherein the end surface comprises a planar surface.

33. The vision enhancing device of claim 32 wherein the planar surface is perpendicular to an axis of symmetry of said conical surface.

34. A vision enhancing device for a person having macular degeneration of the retina, comprising a lens, a light diverging surface on the lens that symmetrically diverges away from the eye at an angle relative to an optic axis to redirect incident light away from the optic axis outwardly toward an un-diseased region of the retina, and further including an end surface on the lens closer to the retina than the light diverging surface.

35. The vision enhancing device of claim 34 wherein the end surface comprises a surface for redirecting light to the un-diseased region of the retina.

36. The vision enhancing device of claim 35 further comprising an intermediate surface between the light diverging surface and the end surface.

37. The vision enhancing device of claim 34 wherein the end surface comprises a conical surface.

38. The vision enhancing device of claim 34 wherein the end surface comprises an arcuate surface.

39. The vision enhancing device of claim 34 wherein the end surface comprises a convex surface.

40. The vision enhancing device of claim 34 wherein the end surface comprises a planar surface.

41. A vision enhancing device for a person having macular degeneration of the retina, comprising a lens and a light diverging insert in the lens, wherein said insert comprises a conical surface that symmetrically diverges away from the eye at an angle relative to an optic axis to redirect incident light away from the optic axis toward and un-diseased region of the retina and further comprises a cylindrical region adjacent to said conical surface.

* * * * *

UNITED STATES PATENT AND TRADEMARK OFFICE
CERTIFICATE OF CORRECTION

| | | |
|---|---|---|
| PATENT NO. | : 7,488,069 B2 | |
| APPLICATION NO. | : 11/359882 | |
| DATED | : February 10, 2009 | |
| INVENTOR(S) | : McAllister Hull | |

It is certified that error appears in the above-identified patent and that said Letters Patent is hereby corrected as shown below:

Column 6, line 66 claim 7; delete "is" after "surface".

Column 7, line 9 claim 11; replace "complex" with -- convex --.

Column 7, line 32 claim 19; replace "claim 14 wherein the cylindrical region adjacent to said conical surface." with -- claim 18 wherein the cylindrical region and conical surface are disposed on a common insert body. --.

Signed and Sealed this

Ninth Day of June, 2009

JOHN DOLL
*Acting Director of the United States Patent and Trademark Office*